(12) United States Patent
Laurencin et al.

(10) Patent No.: US 8,161,224 B2
(45) Date of Patent: Apr. 17, 2012

(54) INTERFACE BETWEEN A TWIN-WIRE BUS AND A SINGLE-WIRE BUS

(75) Inventors: Christophe Laurencin, Peypin (FR); Jean-Louis Modave, Ottignies (BE)

(73) Assignees: STMicroelectronics (Rousset) SAS, Rousset (FR); Proton World Internationl N.V., Zaventem (BE)

(*) Notice: Subject to any disclaimer, the term of this patent is extended or adjusted under 35 U.S.C. 154(b) by 458 days.

(21) Appl. No.: 12/502,634

(22) Filed: Jul. 14, 2009

(65) Prior Publication Data

US 2010/0017553 A1 Jan. 21, 2010

(30) Foreign Application Priority Data

Jul. 16, 2008 (FR) ...................................... 08 54820

(51) Int. Cl.
*G06F 13/36* (2006.01)
*G06F 13/20* (2006.01)
(52) U.S. Cl. ........................................ 710/315; 710/313
(58) Field of Classification Search .................. 710/306, 710/307, 313, 315
See application file for complete search history.

(56) References Cited

U.S. PATENT DOCUMENTS

| 6,066,964 | A | 5/2000 | Meneghini |
| 6,412,072 | B2 * | 6/2002 | Little et al. ................ 726/34 |
| 6,735,657 | B1 * | 5/2004 | Huang et al. ................ 710/305 |
| 2005/0259609 | A1 * | 11/2005 | Hansquine et al. ........... 370/328 |
| 2009/0070548 | A1 * | 3/2009 | Thomsen .................... 712/1 |
| 2009/0177820 | A1 * | 7/2009 | Ranade et al. ............... 710/106 |
| 2010/0005215 | A1 * | 1/2010 | Kneer et al. ................ 710/313 |

FOREIGN PATENT DOCUMENTS

WO WO 2007/004178 A1 1/2007

OTHER PUBLICATIONS

"CEC-to-I2C Bridge With the MSP430". Application Report SLAA377. Texas Instruments, Inc. Dec. 2007.*
"How to Use the DS2482 I2C 1-Wire Master". Application Note 3684. Maxim Integrated Products. Nov. 7, 2005.*
French Search Report dated Feb. 5, 2009, from French Application No. 08/54820.

* cited by examiner

*Primary Examiner* — Thomas J Cleary
(74) *Attorney, Agent, or Firm* — Wolf, Greenfield & Sacks, P.C.

(57) ABSTRACT

A method and a device for converting a first bus including at least a data wire and a clock wire into a single-wire bus, wherein a data bit of the first bus is converted on half a period of the clock signal for transmission over the second bus, a waiting pattern being placed on the second bus during the other half-period.

9 Claims, 6 Drawing Sheets

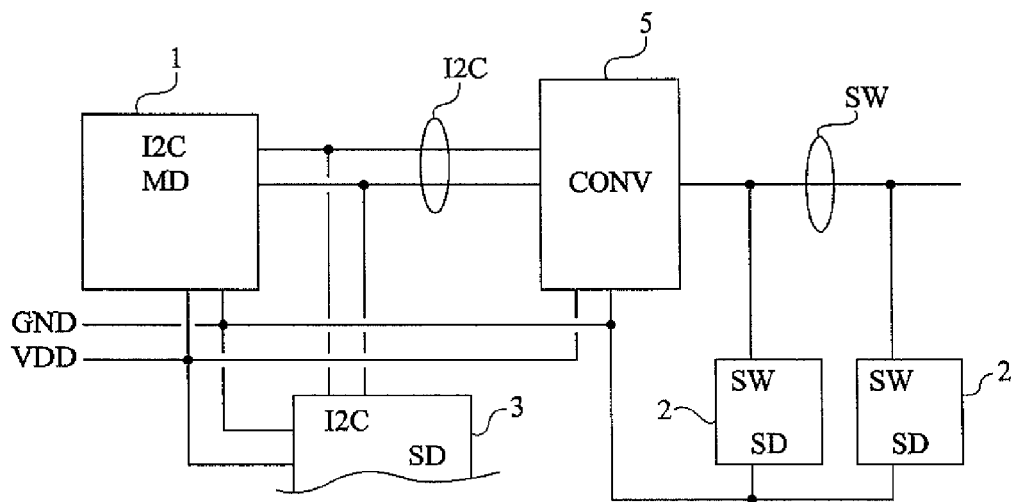
Fig 1
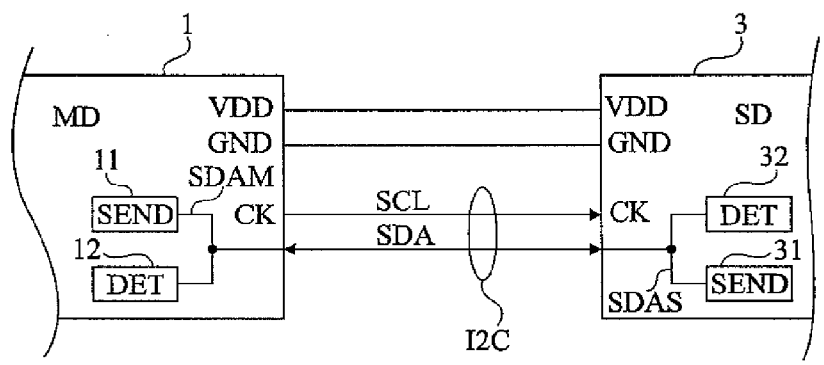
Fig 2
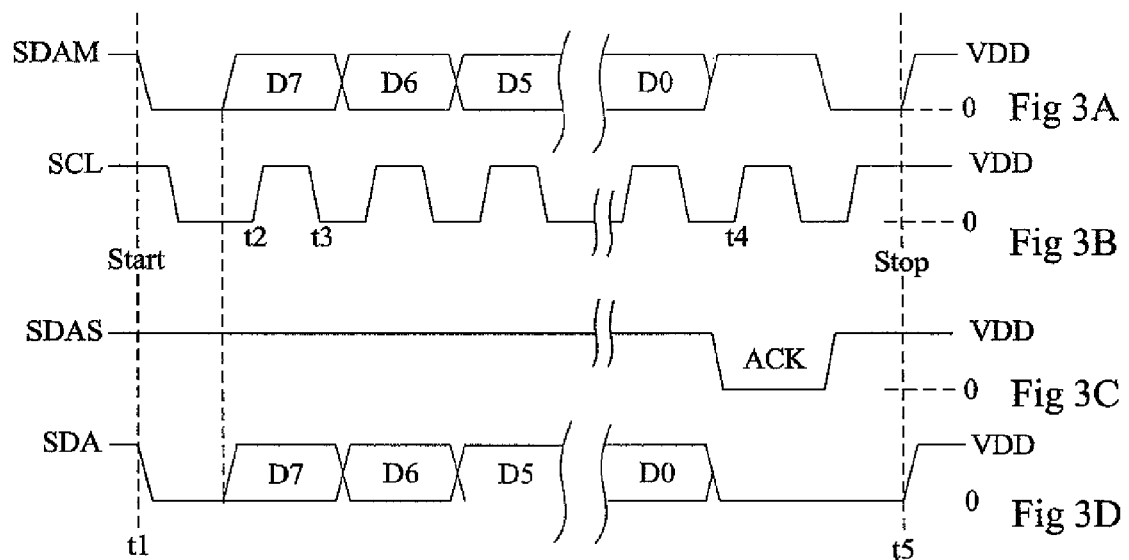

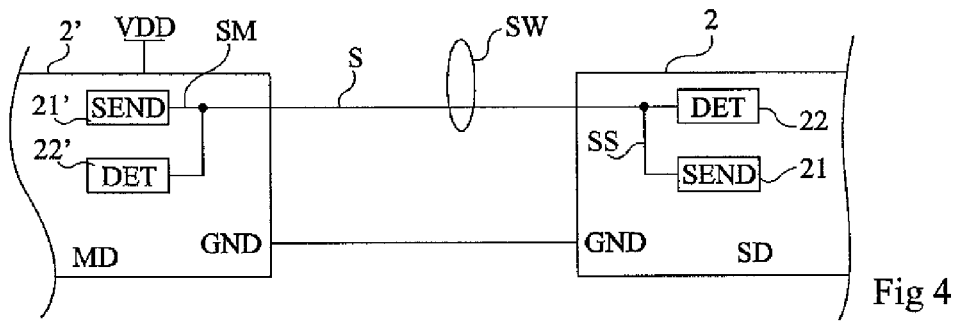
Fig 4
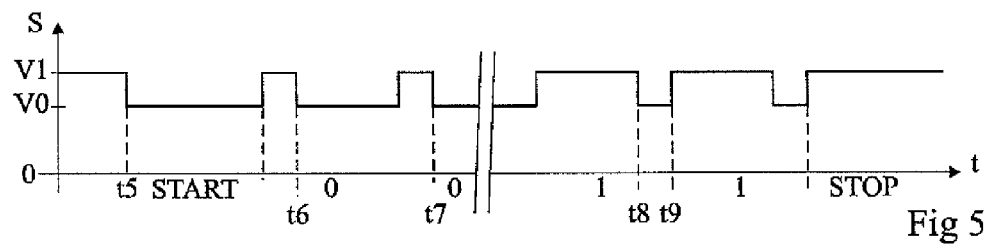
Fig 5
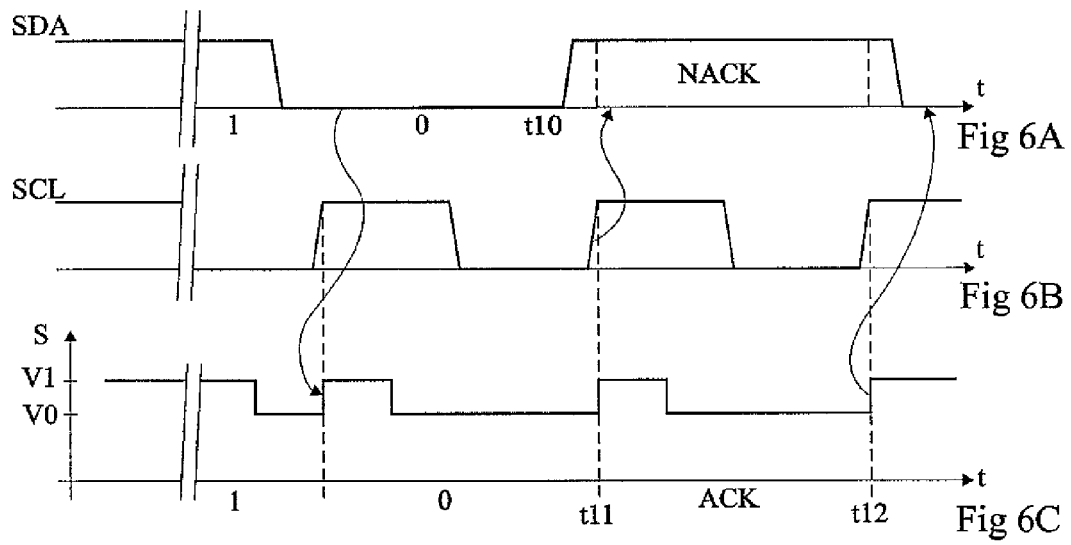
Fig 6A
Fig 6B
Fig 6C

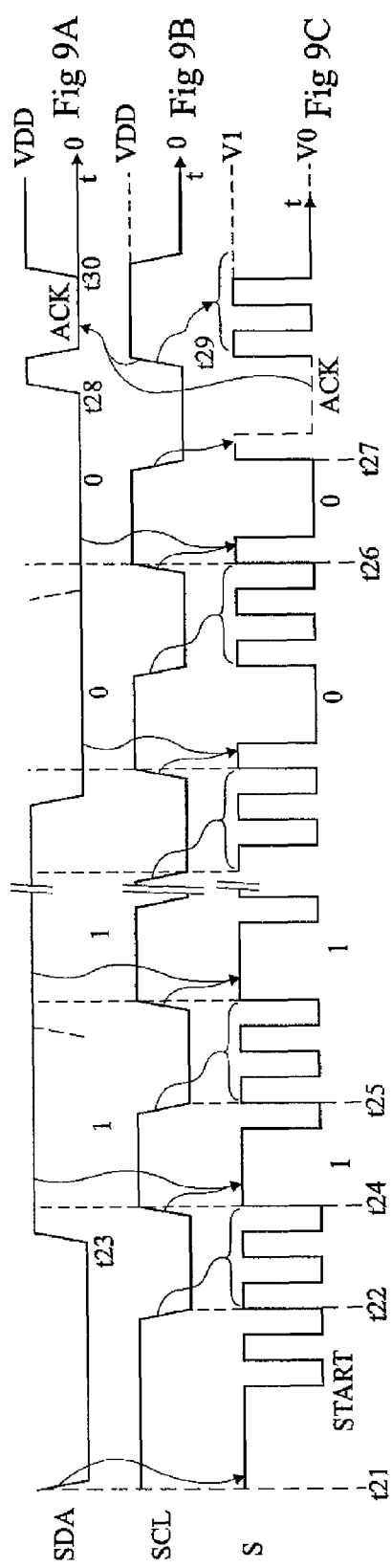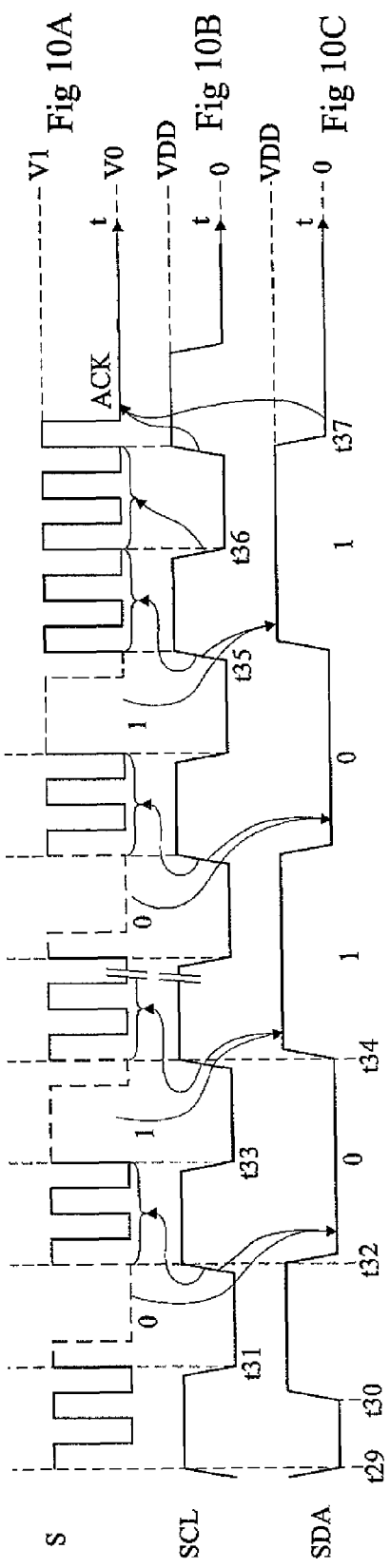

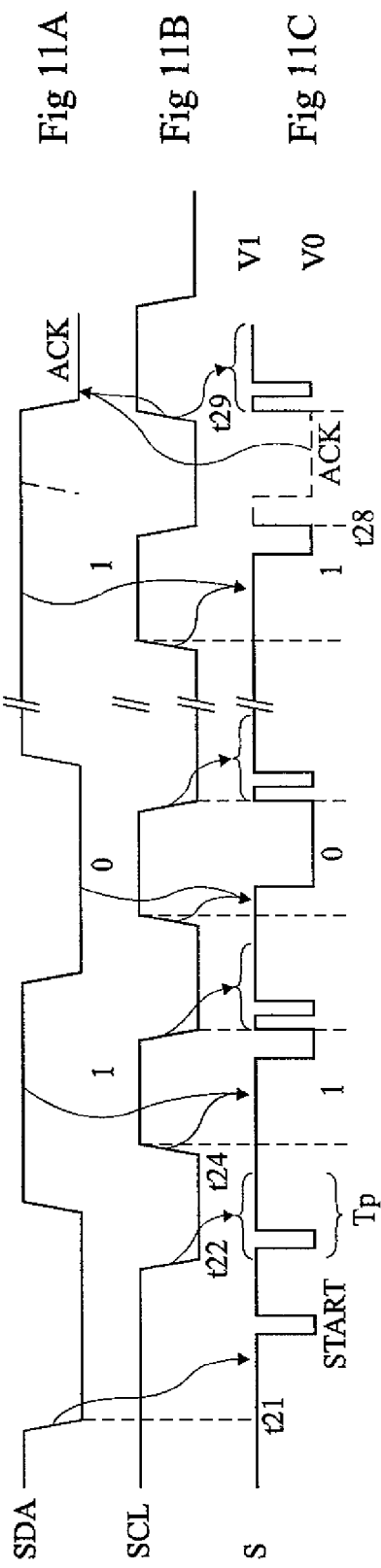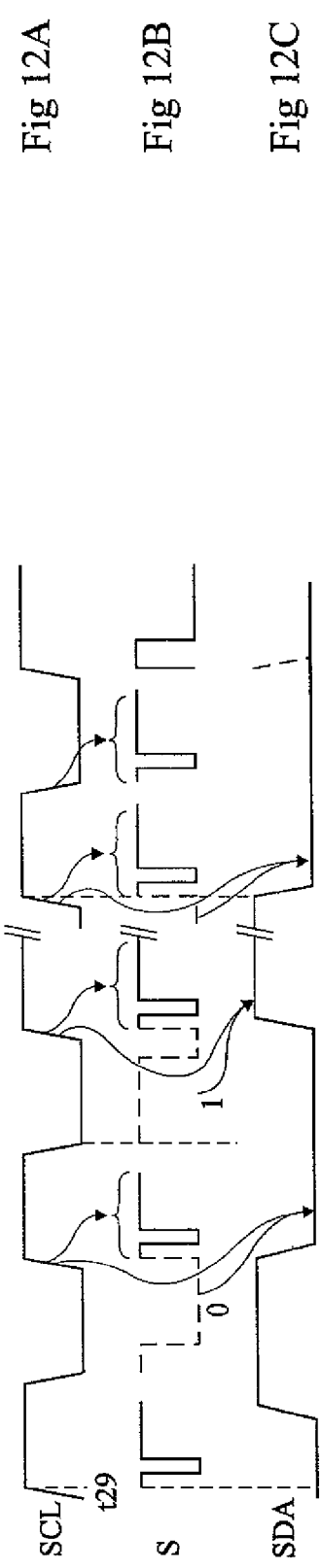

INTERFACE BETWEEN A TWIN-WIRE BUS AND A SINGLE-WIRE BUS

CROSS REFERENCE TO RELATED APPLICATIONS

This application claims the priority benefit of French patent application number 08/54820, filed on Jul. 16, 2008, entitled "INTERFACE BETWEEN A TWIN-WIRE BUS AND A SINGLE-WIRE BUS," which is hereby incorporated by reference to the maximum extent allowable by law.

BACKGROUND OF THE INVENTION

1. Field of the Invention

The present invention relates to electronic circuits and, more specifically, to the transmission of digital data between two circuits in a system of master-slave type. The present invention more specifically relates to the conversion of digital signals between a first bus of twin-wire type (data and clock) and a second bus of single-wire type.

2. Discussion of the Related Art

Many systems of conversion or of interface between communication buses adapted to different protocols are known. Such systems are most often intended for multiple-wire buses on both sides.

It would be desirable to have a solution to enable a communication of master-slave type between two circuits, where the master device of the communication uses a bus comprising a data wire and a clock wire and where the slave device uses a bus comprising a single wire.

It would also be desirable to have such a solution even if the circuit operating on the single-wire bus draws its power supply from this wire.

It would also be desirable to solve the possible problems of synchronization of the exchanges between the two circuits.

SUMMARY OF THE INVENTION

An object of the present invention is to overcome all or part of the disadvantages adversely affecting the compatibility of communications between a twin-wire bus and a single-wire bus.

An embodiment more specifically aims at a solution in a communication system of master-slave type where the single-wire bus also conveys the power supply of one of the circuits.

To achieve all or part of these objects as well as others, an embodiment provides a method for converting a first bus comprising at least a data wire and a clock wire into a single-wire bus, wherein a data bit of the first bus is converted on half a period of the clock signal for transmission over the second bus, a waiting pattern being placed on the second bus during the other half-period.

According to an embodiment of the present invention, the waiting pattern is present on each first half-period of the signal present on the clock signal in a transmission from the second bus to the first bus and on each second half-period of the signal present on the clock wire for a transmission in the other direction.

According to an embodiment of the present invention, the waiting pattern is a pulse train of fixed duration.

According to an embodiment of the present invention, the waiting pattern corresponds to a repeating of the transmitted bit.

According to an embodiment of the present invention, a data bit to be transmitted from the first bus to the second bus is set on the second bus on occurrence of a rising edge on the clock wire of the first bus.

According to an embodiment of the present invention, a data bit to be transmitted from the second bus to the first bus is set, on the data wire of the first bus, on occurrence of a rising edge on the clock wire of the first bus.

According to an embodiment of the present invention, an acknowledgement pattern, arriving on the second bus in a second half-period of the signal present on the clock wire, is converted to be transmitted over the data wire of the first bus on the next rising edge of this signal.

The present invention also provides a device for converting a transmission between a first bus comprising at least a data wire and a clock wire, and a second single-wire bus.

The present invention also provides a master-slave communication system between a first device capable of communicating over an I2C bus and a second device capable of communicating over a single-wire bus, comprising at least such a conversion device.

According to an embodiment of the present invention, the first device is a printer and the second device is an ink cartridge.

The foregoing objects, features, and advantages of the present invention will be discussed in detail in the following non-limiting description of specific embodiments in connection with the accompanying drawings.

BRIEF DESCRIPTION OF THE DRAWINGS

FIG. 1 is a block diagram of an embodiment of a communication system;

FIG. 2 partially shows in the form of blocks two circuits capable of communicating in an I2C-type master-slave protocol;

FIGS. 3A, 3B, 3C, and 3D illustrate a communication between the two circuits of FIG. 2;

FIG. 4 partially shows in the form of blocks two circuits capable of communicating according to a master-slave protocol over a single-wire bus;

FIG. 5 is a timing diagram illustrating a communication between the two circuits of FIG. 4;

FIGS. 6A, 6B, and 6C are timing diagrams illustrating a problem which arises for a conversion between the I2C and single-wire buses of FIGS. 2 and 4;

FIGS. 9A, 9B, and 9C are timing diagrams illustrating an example of communication in the twin-wire to single-wire direction with the coding of FIG. 8;

FIGS. 10A, 10B, and 10C are timing diagrams illustrating an example of communication in the single-wire bus to twin-wire bus direction with the coding of FIG. 8;

FIGS. 11A, 11B, and 11C are timing diagrams illustrating an example of communication in the twin-wire bus to single-wire bus direction with another example of coding;

FIGS. 12A, 12B, and 12C are timing diagrams illustrating an example of communication in the single-wire bus to twin-wire bus direction with another example of coding.

DETAILED DESCRIPTION

Figure 7:
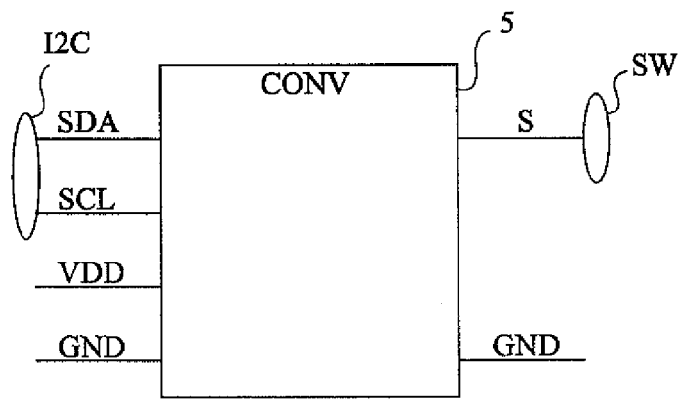
FIG. 7 is a block diagram of an embodiment of an interface or conversion circuit.

The same elements have been designated with the same reference numerals in the different drawings.

For clarity, only those steps and elements which are useful to the understanding of the discussed embodiments will be described. In particular, what exploitation of the data is made in each of the communicating circuits has not been detailed, the described embodiments being compatible with the current uses of such data. Further, the generation of the signals to be transmitted by the different communicating circuits has not been detailed either, the present invention being here again compatible with usual circuits for generating such signals.

The embodiments will refer hereafter to a communication between a master device using a protocol known as I2C and a slave device using a single-wire protocol of the type described in U.S. Pat. No. 5,903,607 and European patent 0798901. The present invention however more generally applies to any communication protocol using on the twin-wire bus side a data wire and a clock wire (for example, the protocol known as SPI). It also applies to any protocol sharing a single-wire bus for the data and a clock signal (for example, the protocol known as SWP—Single Wire Protocol).

FIG. 1 is a block diagram of an embodiment of a system of communication between a circuit 1 capable of transmitting data according to the I2C protocol and other circuits among which at least one circuit 2 capable of communicating according to a single-wire protocol SW. In the example of FIG. 1, circuit 1 is a master circuit (MD) and is capable of communicating, on the side of the I2C bus, with one or several slave devices 3 (SD). The I2C bus is connected to a circuit 5 of conversion (CONV) into a single-wire bus SW. On the side of bus SW, one or several circuits 2 of slave type are capable of being connected. The different circuits of the system may be powered independently from one another or, as shown, at least circuits 1, 3, and 5 are powered by a supply bus capable of conveying at least one supply voltage VDD and one reference voltage GND, for example, the ground. On the side of circuits 2, said circuits are connected to a voltage reference which may be the same (GND) as for the other circuits or be a different ground. In this last case, conversion circuit 5 is provided with an isolation barrier. According to another variation, circuits 2 are also powered independently from bus SW, for example, with voltage VDD or the like.

FIG. 2 is a partial block diagram showing circuits 1 and 3 of FIG. 1.

Each circuit 1, 3 comprises, for example, a transmit circuit (SEND) 11, 31 and a receive circuit (DET) 12, 32. Circuits 1 and 3 are connected to each other by the I2C bus as well as by the two wires VDD and GND of the supply bus. A first wire SCL of the I2C bus conveys a clock signal SCL between two clock 15 terminals CK of circuits 1 and 3. Typically, the clock signal is imposed by master circuit 1. A second wire SDA of bus I2C conveys the data between the two circuits. The I2C bus is bidirectional.

FIGS. 3A, 3B, 3C, and 3D are timing diagrams illustrating a communication between circuits 1 and 3 of FIG. 2. These drawings illustrate an example of transmission of a data word (typically, a byte) from master circuit 1 to slave circuit 3. To make the description clearer, FIGS. 3A, 3C, and 3D show the shape of signals SDAM, SDAS, and SDA respectively corresponding to the signal set by transmit circuit 11 of the master circuit on wire SDA, to the signal set by circuit 31 on this wire, and to the resulting level of this wire SDA. Despite the simplified representation of FIG. 2, it is considered that respective receive circuits 12 and 32 of circuits 1 and 3 observe the state of wire SDA independently from levels SDAM and SDAS imposed by transmit circuits 11 and 31. Similarly, for simplification, the voltage drops are neglected with respect to the supply voltages and it is considered that the high levels correspond to voltage VDD and that the low levels correspond to the ground.

In the idle state, both wires SCL and SDA of the I2C bus are in the high level. Assuming that circuit 1 wants to transmit a data frame to circuit 3, it takes control over the bus by imposing a low level on signal SDA (time t1) while signal SCL remains in the high level. Once this starting condition (Start) has been fulfilled, master circuit 1 generates a clock signal SCL. Then, circuit 1 imposes a level 0 or 1 on wire SDA according to first bit D7 of the byte. This setting of the level of wire SDA should be performed before the rising edge of the clock signal (time t2) which validates the transmitted data. When signal SCL returns to the low level (time t3), master circuit 1 may impose the level corresponding to the state of the next bit D6 on wire SDA, and so on. Once the last bit D0 has been transmitted, the master circuit sets signal SDAM to the high level, to monitor the arrival of an acknowledgement. Its detection circuit 12 monitors at the same time the real state of wire SDA. To indicate a proper reception, slave circuit 3 imposes a low level (FIG. 3C) on wire SDA. The master circuit verifies the state of wire SDA at the rising edge (time t4) of signal SCL which follows its setting to the high state of signal SDAM. If wire SDA is at the low level (as illustrated in FIG. 3), this means a successful transmission. In the opposite case, it should retransmit the data (a starting condition—Start—should for this purpose be transmitted over the I2C bus). An end of transmission (freeing of the bus) is performed by the master circuit by switching wire SDA to the high level while signal SCL is also at the high level (time t5). Once this stopping condition (stop) has been fulfilled, the I2C bus is free to start another I2C frame. It may, for example, be a transmission from circuit 3 to circuit 1. The I2C communication protocol sets different additional conditions in the transmission according to whether it concerns an address, data, a writing into, or a reading from the slave circuit, etc.

For simplification, reference is made to switchings to high and low levels. In practice, an I2C bus most often operates by freeing of the bus for the high state and forcing to the low state.

FIG. 4 is a partial block diagram showing circuits 2 of FIG. 1, assuming that one of them (noted 2' in FIG. 4) imposes to the other a communication according to a master-slave single-wire protocol.

Like circuits 1 and 3, each circuit 2 or 2' comprises a transmit circuit (SEND) 21, 21' and a receive circuit (DET) 22, 22' capable of being connected to the single wire S of bus SW. The two circuits 2 and 2' further share a reference voltage connection (typically, ground GND). For a communication from circuit 2' to circuit 2, circuit 2' imposes a signal SM on the bus. For a communication from circuit 2 to circuit 2', circuit 2 imposes a signal SS on the bus. The circuit which causes the transmission imposes the clock on the bus. In the same way as for FIG. 2, signals SM and SS have been schematized in FIG. 4 as respectively coming from circuits 21' and 21 and it is considered that circuits 22' and 22 only see the state of signal S.

FIG. 5 is a timing diagram showing an example of the shape of signal S imposed by master circuit 2' illustrating a communication between circuits 2' and 2.

The single-wire protocol comprises transmitting over the bus both a clock or synchronization signal and the data. Independently from the communication, master circuit 2' generally powers slave circuit 2 as illustrated in FIG. 4, where only master circuit 2' receives supply voltage VDD. The slave circuit draws its power supply from a filtering of signal S having an idle level imposed by the master circuit, which is a high level V1.

To transmit data from circuit 2' to circuit 2, circuit 2' modulates the amplitude of signal SM between two levels V1 and V0, for example, both positive, according to a predefined coding. This modulation can be found on signal S. In the shown example, a transmission is initialized by a starting bit START in which signal S is forced (time t5) to level V0. This initializes slave circuit 2 and prepares it to receive data. Master circuit 2' modulates the level of signal S at the rate of a clock signal which sets the transmission rate. The transmission of a bit at level 0 is performed, for example, with a pulse of level V1 shorter than the half-period of the clock signal (for example, one quarter of the period) while a level 1 is coded with a pulse of level V1 greater than the half-period of this clock signal (for example, three quarters of the period). The slave circuit detects the amplitude variation and the corresponding duration of the high and low pulses to determine the value of the transmitted bits.

In the direction from slave circuit 2 to master circuit 2', the slave circuit modifies the load that it imposes on wire S according to the level of the bit that it wants to transmit. Here again, the rate of the transmission is set by a clock signal at the rate of which circuit 2 modulates the amplitude of signal S. The clock is here set by an internal clock of circuit 2 while the idle level (V1) of the bus remains set by circuit 2'.

I2C and SW buses are both half-duplex buses. The function of conversion or interface circuit 5 (FIG. 1) is, in a way, to transform a transmission from circuit 1 of FIG. 2 so that it can be seen by circuit 2 as if it came from a circuit 2' (FIG. 4), and to transform a transmission from circuit 2 of FIG. 4 so that it can be seen by circuit 1 as if it came from circuit 3 (FIG. 2).

FIGS. 6A, 6B, and 6C illustrate an example of what an interface circuit could perform between an I2C bus and a single-wire bus. A critical point is that, on the side of the I2C bus, the acknowledgement bit should be detected at the end of a frame. In FIGS. 6A to 6C, only the end of such a frame has been illustrated by the transmission of a 1, followed by a 0 on the SDA signal, assumed to have been converted on the single-wire bus side with pulse shapes of the type illustrated in FIG. 5. As indicated in relation with FIGS. 3A to 3D, once the last bit has been transmitted, the master circuit communicating according to the I2C protocol sets the SDA wire to the high state (time t10) and monitors at the same time the level of this wire to detect a forcing to the low state caused by the slave circuit, indicating a correct transmission. If, at the next rising edge (time t11) of signal SCL, signal SDA has not been pulled to the low state by the slave circuit, the master circuit considers an incorrect transmission. Now, the slave circuit could only, with the protocol of FIG. 5, set a signal corresponding to an acknowledgement (for example, the equivalent of the transmission of a 0) so that it is interpreted by the interface and transmitted on the I2C bus side, from this time t11, which follows the last bit of the data that it receives (in this example, a state 0). Accordingly, signal SDA would only be pulled to the low state at the next rising edge (time t12) of signal SCL. At time t1, the master circuit would interpret an absence of acknowledgement (NACK).

FIG. 7 shows, in the form of blocks, an embodiment of a circuit 5 of conversion between an I2C bus and an SW bus. In the example of FIG. 7, it is considered that circuit 5 is powered on the I2C bus side (for example, by the master circuit) and that the circuit on the side of bus SW draws its power supply from signal S. Circuit 5 is, for example, made in the form of a processor (for example, a microprocessor) capable of executing software instructions representative of an algorithm of conversion of the data between the two buses. According to another embodiment, circuit 5 is a circuit representing a state machine in wired logic. According to still another example, circuit 5 is a specific integrated circuit (ASIC), a microcontroller, a programmable gate array (FPGA). All these circuits have their own internal clock.

To enable a correct synchronization in transmissions between the two buses, it is provided to code, on the SW bus side, the states of the bits over a half period of signal SCL of the I2C bus, and to complete the remaining period with a determined pattern. It is also provided to invert the position of the useful signal in the period of signal SCL between the first and the second half-period according to the master-slave or slave-master transmission direction, and thus according to the conversion direction, from I2C to SW, or from SW to I2C.

Figure 8:
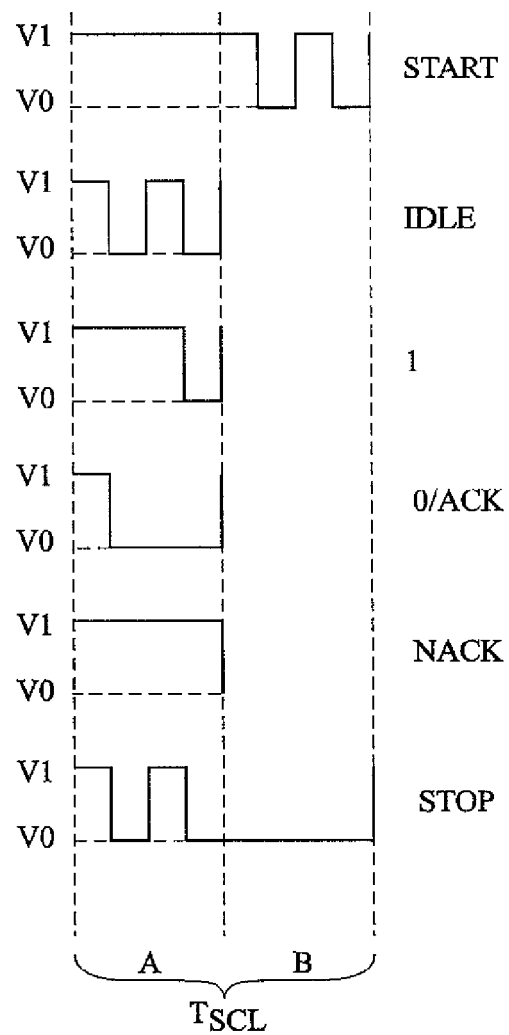
FIG. 8 illustrates a mode of the coding performed by the conversion circuit of FIG. 7.

FIG. 8 illustrates an example of a coding on the SW bus side performed by conversion circuit 5. A predetermined pattern (IDLE) formed, in this example, of a pulse train representing two pulses at the high level (V1) over ⅛ of period $T_{SCL}$, is used to complete the useful signal in the first or second half-period A or B of signal SCL. Pattern IDLE is generated by circuit 5 so that the transmission by the devices connected to this circuit is not modified.

A starting bit transmitted by the I2C bus is converted into a high level (V1) during a first half-period A of signal SCL and is followed in the second half-period B by pattern IDLE.

A bit at state 1 respects the coding of the SW protocol with a pulse at state V1 taking up ¾ of the useful period (½ of the period of signal SCL).

A bit at state 0 corresponds to a level V1 during ¼ of the useful period. The pattern is used to transmit, from the slave device, an acknowledgement bit ACK.

A no acknowledgement bit NACK is represented by a permanent high level over the useful period (half-period of signal SCL) since the idle state of the SW bus is high level V1.

A stop bit is represented, over a full period $T_{SCL}$ of signal SCL, by pattern IDLE followed by a low level in second half-period B.

FIGS. 9A, 9B, and 9C are timing diagrams illustrating an example of conversion, by element 5 of FIG. 7, of a transmission of a data byte from the I2C bus to the SW bus. In the example of FIGS. 9A to 9C, patterns such as illustrated in FIG. 8 are assumed.

Circuit 5 detects a switching (time t21) to the low state of signal SDA while signal SCL remains in the high state, which identifies a starting conditions of the I2C bus. This detection causes the generation, by circuit 5, of a starting pattern START of communication over wire S. At the next falling edge (time t22) of signal SCL over the I2C bus, element 5 sets a waiting pattern IDLE on wire S during a half-period of clock SCL. During this half-period, the setting of the first data bit to be transmitted usually occurs on signal SDA (time t23). In this example, a first bit at state 1 is assumed. The next rising edge of signal SCL (time t24) causes the setting, by circuit 5, of a bit pattern to state 1 for a half-period of signal SCL on wire S. At the next falling edge of the clock signal (time t25), element 5 sets waiting pattern IDLE. This operation carries on until the transmission of the last bit of the word (time t26), which is followed by the arrival on the I2C bus of an acknowledgement request by a setting of signal SDA (time t28) to the high state and the monitoring, by the circuit connected on this bus, of the state of this signal to detect the arrival of an acknowledgement. As soon as the slave circuit connected to the SW bus has received the last bit of the transmitted byte, it sets in accordance with the single-wire protocol an acknowledgement bit ACK at the falling edge (time t27) of signal SCL which immediately follows the rising edge having set the last bit. This means that circuit 5 does not add waiting pattern IDLE to the last bit. Accordingly, circuit 5 is capable, at time t29 corresponding to the next rising edge of signal SCL, to detect the acknowledgement sent back over the SW bus, to pull signal SDA to the low state, thus enabling the master circuit connected to the I2C bus to detect acknowledgement ACK. As a variation, for example in a configuration operating in "pull up" where level V0 prevails over level V1, pattern ACK prevails over pattern IDLE (where pattern IDLE is at level V0, pattern ACK must also be at that level).

At time t29, element 5 also sets a waiting pattern IDLE on single-wire bus SW to enable the slave circuit to respond to the master circuit. Further, circuit 5 frees wire SDA, for example, at a time t30, before the next falling edge of signal SCL. In FIG. 9C, all the patterns of signal S are set by element 5, except for the acknowledgement pattern illustrated in dotted lines (FIG. 9C) at time t27, which originates from the slave circuit. On the I2C bus side, all patterns are set by the master device, except for the switching at time t29 of signal SDA to the low state, which is caused by conversion circuit 5 having interpreted the acknowledgement pattern of the slave device, and for the freeing of wire SDA at time t30. If the slave circuit does not have to respond and the transmission is considered as ended, the master circuit maintains wire SDA at the low level (thus canceling the effect caused by the conversion circuit at time t30), and then causes a switching to the high state of signal SDA during a period when signal SCL is in the high state, thus enabling circuit 5 to send a stop pattern to the slave circuit.

FIGS. 10A, 10B, and 10C illustrate an example of a return transmission from the slave device connected on the single-wire bus to the master device of the I2C bus. It is assumed that after the master-slave transmission of FIGS. 9A-9C, circuit 5 frees the I2C bus at time t30. Thus, signal SDA switches back to the high state on the I2C bus corresponding to its idle state. On the slave device side, said device starts a transmission from the next falling edge (time t31) of signal SCL and sets its first response bit. Circuit 2 transmits bits coded by the length of the pulse at level V1. It sets, by means of its internal clock circuits, the shape of the patterns communicated to circuit 5. The frequency is however selected to be greater than the frequency of signal SCL so that it can code the data as illustrated, for example, in FIG. 8. Since circuit 2 receives the frequency of signal SCL through circuit 5, it may set its transmit frequency accordingly. Circuit 5 then interprets the pulse length variations on signal S to convert them, on the side of wire SDA, and behave as a master on the I2C bus side. In the shown example, the setting of the first bit corresponds to a pattern 0 on a half-period of signal SCL. At the next clock cycle of signal SCL (time t32), element 5 transmits the first bit at state 0 that it has interpreted from the single-wire bus on signal SDA by switching said signal to the low state at the same time as it sets, on the SW bus, waiting pattern IDLE. The next falling clock edge (time t33) translates as the reading, by device 5, of the next pattern (for example, state 1) present on signal S. Circuit 5 sets this bit on the I2C bus at the next rising edge (time t34) of signal SCL, and so on until the end of the transmission of the concerned byte. In the same way as for the previous drawings, the patterns of signal S set by circuit 5 have been illustrated in full lines while the patterns set by circuit 2 have been illustrated in dotted lines. At the rising edge of signal SCL (time t35) which follows the reception, by circuit 5, of the last bit of the transmitted word, said circuit sets the waiting bit on wire S. Then, at the next falling edge (time t36), it resets a waiting bit on the second portion of the period of signal SCL. This enables for the switching to the low state of signal SDA, caused by device 1 at the next rising edge (time t37) of signal SCL, to be interpreted by element 5 as an acknowledgement. Circuit 5 then sets, on single-wire bus SW, acknowledgement pattern ACK (corresponding to a bit at state 0).

According to the communication direction, waiting pattern IDLE is thus set either on the first half-period of signal SCL or on the second one. This enables to be able to properly interpret an acknowledgement bit in both directions.

On the I2C bus side, the provided implementation requires no modification of the master device, this implementation being transparent for it. On the slave device side, said device should be able to interpret the waiting device, to sequence the bits and send back pattern ACK in a sequence manageable for a real-time conversion. It actually manages one channel for the bits and another channel for patterns IDLE and the permutation of the channels to transmit in the other direction on time for the conversion towards the I2C bus.

FIGS. 11A, 11B, and 11C and FIGS. 12A, 12B, and 12C illustrate another example of transmission in the successive master-to-slave and slave-to-master directions. This example shows another modification, which is a waiting pattern different from that illustrated in FIG. 8. The waiting pattern generated by converter 5 here is a pulse in the low state (level V0) close to the beginning of the pattern. This pattern is selected to have a duration Tp shorter than the half-period of signal SCL.

As in the previous example, conversion circuit 5 detects (time t21) a start condition on the I2C bus that it transmits over the single-wire bus. As soon as the first falling edge of signal SCL occurs (time t22), circuit 5 sets the waiting pattern on the single-wire bus. Then, at the next rising edge (time t24), it transmits the pattern corresponding to the first transmitted bit. As illustrated in FIG. 11C, the waiting pattern does not last until the rising edge of signal SCL.

As soon as it has decoded the last transmitted bit, the slave device sets the acknowledgement pattern on the single-wire bus (time t28). Since it is synchronized by the decoding of the bits that it receives, this transmission is also synchronized on signal SCL. At the next rising edge (time t29), element 5 forces signal SDA to the low state, thus enabling a detection by the master device. Similarly to the previous example, an inversion of the transmission direction is then assumed at time t29.

Similarly to the discussion of FIGS. 10A to 10C, FIGS. 12A to 12C illustrate the transmission of a byte in the slave-to-master direction. The operation can be deduced from that discussed in relation with the previous drawings.

According to another embodiment, the second channel (half-period of signal SCL) is used to repeat the transmitted bit. It is then used as a redundancy. The waiting pattern then is variable in shape, duration and/or according to the transmission direction.

Figure 13:
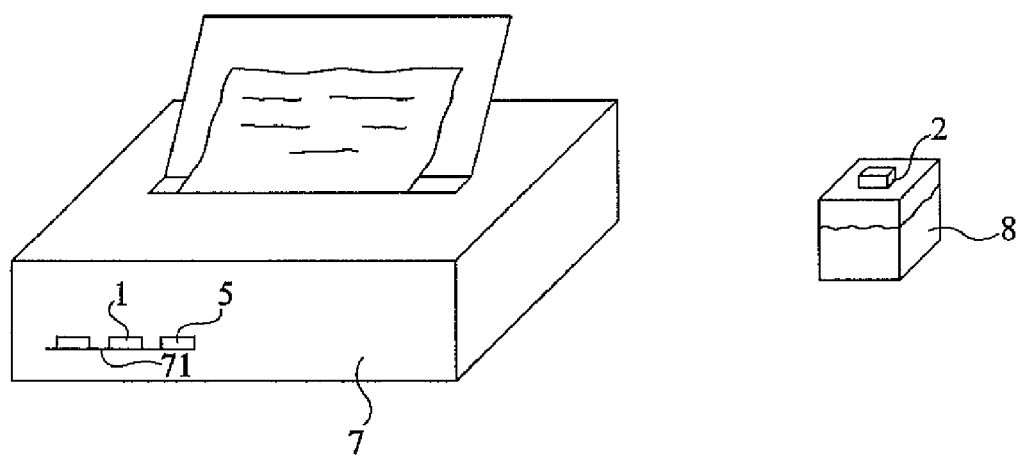
FIG. 13 is a block diagram illustrating an example of application of the described system.

FIG. 13 is a block diagram very schematically illustrating an example of application of the described communication system to communications between a printer 7 and one or several ink cartridges 8. Cartridge 8 has been shown outside of printer 7 but, when it needs to communicate with it, it of course is a cartridge arranged in the printer. Printer 7 is equipped with one or several electronic boards 71 comprising at least a circuit 1 intended to behave as a master circuit to communicate with one or several cartridges 8. The cartridge(s) each comprise a circuit 2 capable of communicate according to a single-wire protocol.

In the shown example, one of electronic circuit boards 71 of the printer comprises at least one hardware or software conversion circuit 5 for converting transmissions over an I2C bus on the printer side into transmissions over a single-wire bus towards a circuit 2 of one or several cartridges.

As a variation, conversion circuit 5 is placed on the cartridge side and not on the printer side.

The above example enables to use simplified circuits in cartridges 8 due to the exploitation of a single-wire bus and to make them compatible with printers only capable of communicating through an I2C bus.

Various embodiments have been described. Various alterations and modifications will occur to those skilled in the art. In particular, a hardware or software embodiment of the conversion circuit depends on the circuits and devices available on the master device side and on the slave device side.

Such alterations, modifications, and improvements are intended to be part of this disclosure, and are intended to be within the spirit and the scope of the present invention. Accordingly, the foregoing description is by way of example is only and is not intended to be limiting. The present invention is limited only as defined in the following claims and the equivalents thereto.

What is claimed is:

1. A method for converting a first bus comprising at least a data wire and a clock wire into a single-wire bus, wherein:
   a data bit of the first bus is converted on half a period of the clock signal for transmission over the second bus; and
   a waiting pattern is set on the second bus during the other half-period, said waiting pattern being present on each first half-period of the signal present on the clock wire in a transmission from the second bus to the first bus and on each second half-period of the signal present on the clock wire for a transmission in the other direction.

2. The method of claim 1, wherein the waiting pattern is a pulse train of fixed duration.

3. The method of claim 1, wherein the waiting pattern corresponds to a repeating of the transmitted bit.

4. The method of claim 1, wherein a data bit to be transmitted from the first bus to the second bus is set on the second bus on occurrence of a rising edge on the clock wire of the first bus.

5. The method of claim 1, wherein a data bit to be transmitted from the second bus to the first bus is set, on the data wire of the first bus, on occurrence of a rising edge on the clock wire of the first bus.

6. The method of claim 1, wherein an acknowledgement pattern, arriving on the second bus in a second half-period of the signal present on the clock wire, is converted to be transmitted over the data wire of the first bus on the next rising edge of this signal.

7. A device for converting a transmission between a first bus comprising at least a data wire and a clock wire, and a second single-wire bus, comprising means for implementing the method of claim 1.

8. A master-slave communication system between a first device capable of communicating over an I2C bus and a second device capable of communicating over a single-wire bus, comprising at least one conversion device of claim 7.

9. The system of claim 8, wherein the first device is a printer and the second device is an ink cartridge.

* * * * *

UNITED STATES PATENT AND TRADEMARK OFFICE
CERTIFICATE OF CORRECTION

PATENT NO. : 8,161,224 B2  Page 1 of 1
APPLICATION NO. : 12/502634
DATED : April 17, 2012
INVENTOR(S) : Christophe Laurencin et al.

It is certified that error appears in the above-identified patent and that said Letters Patent is hereby corrected as shown below:

Col. 9, line 14, should read:
only and is not intended to be limiting. The present inven- Signed and Sealed this
Twenty-ninth Day of May, 2012

David J. Kappos
*Director of the United States Patent and Trademark Office*